United States Patent
Seino

(10) Patent No.: US 9,091,563 B2
(45) Date of Patent: Jul. 28, 2015

(54) IN-VEHICLE NAVIGATION IN COLLABORATION WITH A SERVER

(75) Inventor: Kohei Seino, Shimotsuke (JP)

(73) Assignee: Honda Motor Co., Ltd., Tokyo (JP)

( * ) Notice: Subject to any disclaimer, the term of this patent is extended or adjusted under 35 U.S.C. 154(b) by 439 days.

(21) Appl. No.: 13/297,936

(22) Filed: Nov. 16, 2011

(65) Prior Publication Data

US 2012/0123676 A1  May 17, 2012

(30) Foreign Application Priority Data

Nov. 17, 2010  (JP) ................................ 2010-256532

(51) Int. Cl.
*G01C 21/36* (2006.01)
*G01C 21/34* (2006.01)
*G01C 21/26* (2006.01)

(52) U.S. Cl.
CPC ........ *G01C 21/3679* (2013.01); *G01C 21/3469* (2013.01); *G01C 21/26* (2013.01); *G01C 21/36* (2013.01); *Y02T 90/168* (2013.01); *Y04S 30/12* (2013.01)

(58) Field of Classification Search
CPC .... G01C 21/26; G01C 21/3446; G01C 21/36; G01C 21/32; G08G 1/096827; Y02T 90/163; Y02T 90/161; Y02T 90/164; Y02T 90/16; Y02T 90/165; Y02T 10/7088
USPC .................................................. 701/22, 410
See application file for complete search history.

(56) References Cited

U.S. PATENT DOCUMENTS 8,290,649 B2 * 10/2012 Iwashita et al. .................. 701/22
8,294,420 B2 * 10/2012 Kocher .......................... 320/109
(Continued)

FOREIGN PATENT DOCUMENTS

| JP | 2001215124 | 8/2001 |
|---|---|---|
| JP | 2006064632 | 3/2006 |

(Continued)

OTHER PUBLICATIONS

Translated abstract of JP 2010204042 (see above) from "Patent Abstracts of Japan"; available through http://www.ipdl.inpit.go.jp/homepg_e.ipdl, "PAJ"; accessed on Nov. 16, 2011.

*Primary Examiner* — James Trammell
*Assistant Examiner* — James E Stroud
(74) *Attorney, Agent, or Firm* — Honda Patents & Technologies North America, LLC; Joseph Juliano

(57) ABSTRACT

An in-vehicle navigation apparatus to support sharing of electric vehicle charging point information such that other electric vehicles can use a charging point where its own electric vehicle is charged. If the in-vehicle navigation apparatus determines that a current position is a charging point on the basis of charge information about an electric vehicle, the navigation apparatus determines whether the charging point has public availability by referring to facility information, such as facility positions in map data stored in a map data storage unit. The in-vehicle navigation apparatus may transmit charging points having public availability to a server apparatus and not transmit the charging points having no public availability to the server apparatus. Vehicles may download charging points uploaded by other vehicles.

12 Claims, 7 Drawing Sheets

(56) References Cited

U.S. PATENT DOCUMENTS

| | | | |
|---|---|---|---|
| 8,301,365 B2* | 10/2012 | Niwa et al. | 701/532 |
| 8,577,528 B2* | 11/2013 | Uyeki | 701/22 |
| 2009/0246596 A1* | 10/2009 | Sridhar et al. | 429/34 |
| 2009/0313103 A1* | 12/2009 | Ambrosio et al. | 705/14.25 |
| 2011/0213780 A1 | 9/2011 | Suganuma et al. | |
| 2012/0078553 A1 | 3/2012 | Kuroda et al. | |
| 2012/0330494 A1* | 12/2012 | Hendrix et al. | 701/29.3 |

FOREIGN PATENT DOCUMENTS

| | | |
|---|---|---|
| JP | 2009002753 | 1/2009 |
| JP | 2010204042 | 9/2010 |
| JP | 2011027714 | 2/2011 |
| JP | 2011086020 | 4/2011 |
| JP | 2011237406 | 11/2011 |
| JP | 2011252957 | 12/2011 |
| JP | 2012058964 | 3/2012 |

* cited by examiner

Claim
IN-VEHICLE NAVIGATION IN COLLABORATION WITH A SERVER

CLAIM OF PRIORITY

The present application claims priority under 35 U.S.C. §119 to Japanese Patent Application No. 2010-256532, filed Nov. 17, 2010, entitled "In-vehicle navigation apparatus and server apparatus." The contents of this application are incorporated herein by reference in their entirety.

BACKGROUND

The present disclosure relates to in-vehicle navigation apparatuses that detect the current positions of their own vehicles to instruct drivers of the vehicles of routes (or, also referred to as courses) to destinations and server apparatuses communicating with the in-vehicle navigation apparatuses.

Electric vehicles (EVs) exist that receive a supply of the electric power from batteries to drive with the power from electric motors. In addition, plug-in hybrid vehicles exist that receive primary power from electric motors and receive auxiliary power from engines. For purposes of the subject matter disclosed herein, electric vehicles include, but are not limited to, plug-in hybrid vehicles (PHVs) that receive auxiliary or primary power from engines.

An electric vehicle may be provided with a power plug for charging the vehicle. In such a case, the power plug may be inserted into an outlet of a point where the battery is capable of being charged (which may be referred to as a charging point or charge point), such as a charging stand, in order to charge the battery.

As charging points are being upgraded or newly installed it may be important for drivers of electric vehicles having shorter traveling distances (e.g., on pure electric modes of operation of an electric vehicle in comparison to gasoline-powered vehicles or gasoline hybrid vehicles) to know positional information about the charging points.

A charge point registering apparatus has been disclosed that registers the current position of its own vehicle in a map database of the own vehicle as a charge point when a state of charge (SOC) value at stop is higher than a SOC value at restart by a certain amount.

One point registering apparatus categorizes charging points (e.g., sorts charging points according to charging modes) on the basis of the charging frequency or the charging time at each point where a battery is charged. That apparatus can also register categorized charging points in a map database of its own vehicle.

SUMMARY

The present disclosure relates to an in-vehicle navigation apparatus and a server apparatus each including a charging point register that registers charging points of vehicles in a map data storage unit.

In some systems, a charge point registering apparatus or point registering apparatus has charging points (which may also be referred to as charge points or charging stands) that are registered in the map database of its own vehicle such that the charging points are limitedly used by the own vehicle (for example, the vehicle of which the point registering apparatus is a part). To improve on this, the subject matter disclosed herein includes a new in-vehicle navigation apparatus and a new server apparatus capable of allowing other vehicles to use charging points where its own vehicle is charged while avoiding use of private charging points including private houses by the other vehicles.

According to an embodiment of the present disclosure, an in-vehicle navigation apparatus includes a map data storage unit configured to store map data; a current position detecting unit configured to detect a current position of its own vehicle; a charging point determining unit configured to determine whether the current position detected by the current position detecting unit is a charging point on the basis of charge information on the own vehicle; a charging point registering unit configured to register the charging point determined by the current position detecting unit and a charging point received from an external server apparatus in the map data storage unit; a transmission necessity determining unit configured to determine necessity for transmission of the charging point determined by the charging point determining unit to the server apparatus; and a communicating unit configured to transmit the charging point determined to have the necessity for transmission by the transmission necessity determining unit to the server apparatus and receive a charging point from the server apparatus. The transmission necessity determining unit determines the presence of public availability of the charging point by referring to the map data and determines that the charging point having the public availability has the necessity for transmission.

In the in-vehicle navigation apparatus, if the current position is determined to be a charging point on the basis of the charge information on its own vehicle, it may be determined whether the charging point has public availability by referring to the map data. The charging point determined to have public availability may be transmitted to the server apparatus and the charging point determined not to have public availability is not transmitted to the server apparatus. Accordingly, it might be possible to avoid use of the private charging points including personal houses by other vehicles.

According to another embodiment of the present disclosure, a server apparatus includes a map data storage unit configured to store map data; a communicating unit configured to receive a charging point from an in-vehicle navigation apparatus and transmit a charging point to the in-vehicle navigation apparatus; a registration necessity determining unit configured to determine necessity for registration of the charging point received from the in-vehicle navigation apparatus in the map data storage unit; and a charging point registering unit configured to register the charging point determined to have the necessity for registration by the registration necessity determining unit in the map data storage unit. The registration necessity determining unit determines the presence of public availability of the charging point by referring to the map data and determines that the charging point having public availability has a necessity for registration.

In the server apparatus, the registration necessity determining unit may determine whether the charging point received from the in-vehicle navigation apparatus has necessity for registration in the map data storage unit on the basis of the presence of public availability of the charging point determined by referring to the map data. Accordingly, it might be possible for its own vehicle to use the charging points where other vehicles are charged and which has the public availability while avoiding use of the private charging points including personal houses by the other vehicles.

In the in-vehicle navigation apparatus, the map data in the map data storage unit may include facility information, and the transmission necessity determining unit may refer to the facility information in the map data to determine that the charging point has public availability if a facility exists near the charging point.

The transmission necessity determining unit in the in-vehicle navigation apparatus may refer to the facility information in the map data to determine that the charging point has public availability if a facility exists near the charging point. Accordingly, it might be possible for its own vehicle to use the charging points, near which facilities exist, which has public availability, and where other vehicles are charged, while avoiding use of private charging points including personal houses, near which no facility exists and which has no public availability, by the other vehicles.

In the server apparatus, the map data in the map data storage unit may include facility information, and the registration necessity determining unit may refer to the facility information in the map data to determine that the charging point has public availability if a facility exists near the charging point.

The registration necessity determining unit in the server apparatus may refer to the facility information in the map data to determine that the charging point has public availability if a facility exists near the charging point. Accordingly, it might be possible for its own vehicle to use the charging points, near which facilities exist, which has public availability, and where other vehicles are charged, while avoiding use of private charging points including personal houses, near which no facility exists and which has no public availability, by the other vehicles.

In the above embodiments, the charging point may be a point for electrically charging an electric vehicle. A charging point registering unit may refer to facility information in map data to determine that a current position is a public charging point if a facility does exists near the charging point and otherwise determine the current position is a private charging point. A charging point registering unit may register public charging points in a registry of public charging points and separately register private charging points in a registry of private charging points.

A charging point determining unit may be configured to compare a current state of charge of the vehicle with a previous state of charge of a vehicle to determine that a current position is a charging point if the current state of charge is greater than the previous state of charge by at least a certain threshold. A charging point determining unit may be configured to determine a charging rate of a charging point by comparing a current state of charge with a previous state of charge and taking into account time passed between the current state of charge and the previous state of charge. A server might not register private charging points.

Embodiments of the present disclosure may include computer program products that include one or more instructions to cause one or more processors to perform operations. The operations may include detecting a current position of a vehicle, determining whether the current position is a fueling point on the basis of fueling information of the vehicle, registering the current position as a fueling point in a fueling point register associated with map data if the current position is determined to be a fueling point, and transmitting the current position to a server computer if the current position is determined to be a fueling point.

Determining whether a current position is a fueling point may include determining whether the vehicle has had an increase in fuel, and determining that if the vehicle has had an increase in fuel the current position is a fueling point.

Determining whether a current position is a fueling point may include determining whether the current position is a public fueling point. Determining whether a current position is a public fueling point may include referencing map data to determine if the current location is a public location, and determining that if the current position is a public location and the vehicle is at a fueling point that the current position is a public fueling point.

Registering a current position as a fueling point in a fueling point register associated with map data may include registering the current position in a table of public fueling points if the current position is a public fueling point and registering the current position in a table of private fueling points if the current position is a private fueling point. Fueling points received from a server computer may be registered (e.g., in an in-car navigation system).

Determining whether a current position is a public fueling point may include determining a current position is a public fueling point if a facility exists near the current position. Determining a fueling rate of a fueling point may be performed by comparing a current state of fuel with a previous state of fuel and taking into account time passed between the current state of fuel and the previous state of fuel.

According to the present disclosure, it is possible to allow other vehicles to use charging points, where its own vehicle is charged and which has public availability, while avoiding use of private charging points, such as private houses, by the other vehicles.

DETAILED DESCRIPTION

In-vehicle navigation apparatuses and server apparatuses according to embodiments of the present disclosure will be described with reference to the attached drawings.

Figure 1:
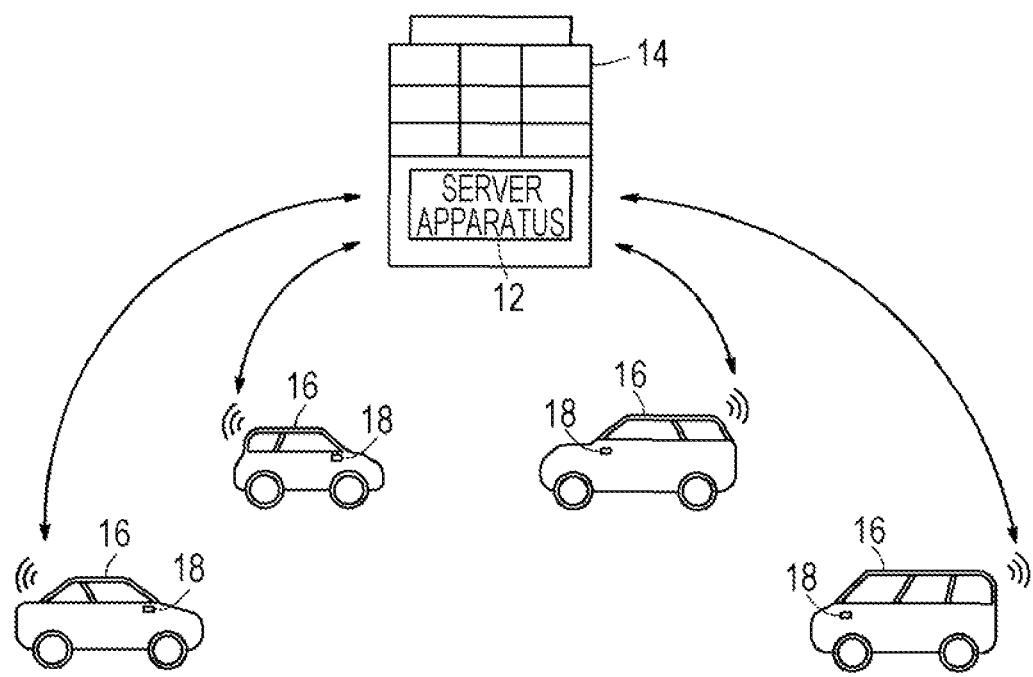
FIG. 1 schematically illustrates a navigation system including an in-vehicle navigation apparatus.

FIG. 1 schematically illustrates a navigation system 10 including a server apparatus 12 and an in-vehicle navigation apparatus (hereinafter also referred to as a navigation apparatus) 18 according to an embodiment of the present disclosure.

The navigation system 10 includes the server apparatus 12 provided in an information center 14 and the respective navigation apparatuses 18 mounted in multiple electric vehicles 16. As used herein, an electric vehicle may be a vehicle whose power is solely provided by batteries, a plug-in hybrid electric vehicle (e.g., a hybrid vehicle using a combination of a gasoline engine, diesel engine or other fossil-fuel based engine, and an electric motor to provide power to the powertrain of a vehicle), a plug-in fuel cell vehicle, or any other vehicle having the ability to have a power source charged electrically.

In the navigation system 10, for example, map data may be distributed from the server apparatus 12 to the navigation apparatuses 18 in the electric vehicles 16, and traveling data about the electric vehicles 16 may be provided to the server apparatus 12. For example, information about streets and points of interest may be sent from the server apparatus 12 to the navigation apparatuses 18. As another example, traveling data about each electric vehicle 16 may be transmitted to the server apparatus 12 where the data is subjected to statistical processing and traffic information, such as traffic jam information, is used among the electric vehicles 16 having the navigation apparatuses 18 mounted therein. The information center 14 communicates with each electric vehicle 16 over, for example, a mobile communication network, such as a CDMA (Code Division Multiple Access)-based network.

The electric vehicles 16 include plug-in hybrid vehicles, so-called PHV or PHEV automobiles, which receive supply of the electric power from in-vehicle batteries to drive with the power from electric motors and auxiliary power from engines (not shown), in addition to the battery electric vehicles (EVs), which receive supply of the electric power from in-vehicle batteries to drive with the power from electric motors (not shown).

Figure 2:
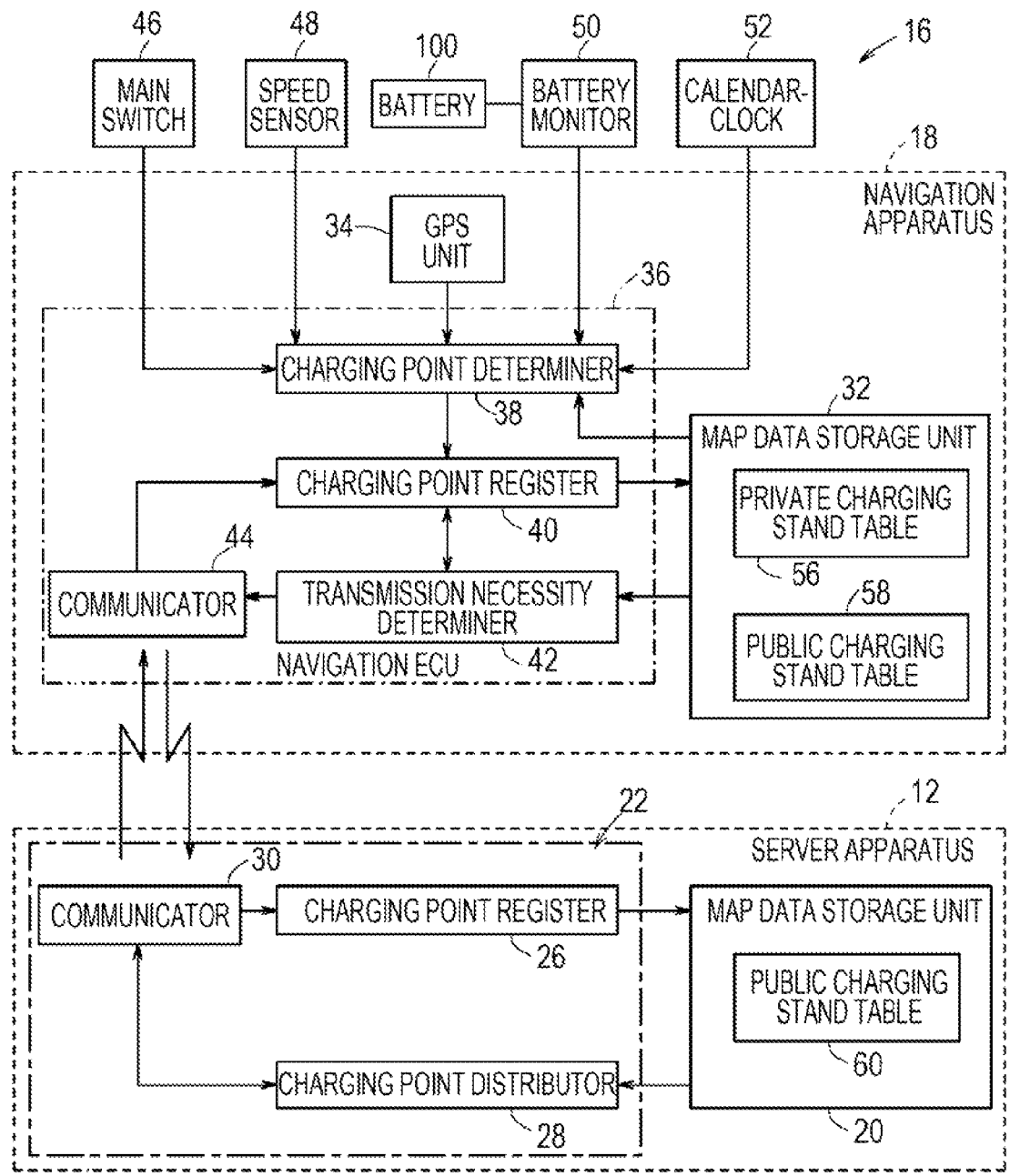
FIG. 2 is a block diagram illustrating an example of a detailed configuration of the navigation system illustrated in FIG. 1.

FIG. 2 is a block diagram illustrating an example of a detailed configuration of the navigation system 10 including the in-vehicle navigation apparatus 18.

In the navigation system 10, the server apparatus 12 includes a map data storage unit 20 storing map data including a road map and a control unit 22.

The control unit 22 in the server apparatus 12 includes, for example, a microcomputer and a digital signal processor (DSP) and also operates as a function realizing unit in which a central processing unit (CPU) executes programs stored in a memory, such as a read only memory (ROM), on the basis of various inputs to realize various functions. In the present embodiment, the control unit 22 functions as, for example, a charging point register 26, a charging point distributor 28, and a communicator 30 described in detail below.

The navigation apparatus 18 in the navigation system 10 includes a map data storage unit 32 that stores map data including a road map, a global positioning system (GPS) unit 34 (a current-position detecting unit) that detects the current position (latitude and longitude information) of the electric vehicle 16 (its own vehicle), and a control unit (a navigation electronic control unit (ECU)) 36.

The navigation ECU 36 includes, for example, a microcomputer and a DSP and also operates as a function realizing unit in which a CPU executes programs stored in a memory, such as a ROM, on the basis of various inputs to realize various functions. In the present embodiment, the navigation ECU 36 functions as, for example, a charging point determiner 38, a charging point register 40, a transmission necessity determiner 42, and a communicator 44 described in detail below.

In addition to the GPS unit 34 and the charging point register 40, a main switch 46, a speed sensor 48, a battery monitor 50, a calendar-clock 52 (a year-month-date-time generator), and the map data storage unit 32 are connected to the charging point determiner 38.

The main switch 46 may be an ignition switch of a vehicle. In response to an operation to turn on the main switch 46, the battery 100 is capable of supplying power to an electric motor (not shown) and the electric vehicle 16 is in a ready-to-travel state or in a traveling state. In response to an operation to turn off the main switch 46, the supply of power from the battery to the electric motor is blocked and the electric vehicle 16 is in a stop state.

When the main switch 46 is turned off, the battery monitor 50 sets a state in which the charging is available. During the charge available state, a charge plug (not shown) of the electric vehicle 16 is inserted into an outlet of a charging stand in order to charge the battery.

The speed sensor 48 detects the speed of the electric vehicle 16. The battery monitor 50 is provided between the on-vehicle load, including the electric motor, and the battery 100. The battery monitor 50 has known functions including calculation of the amount of consumption and the remaining electric charge (SOC or "state of charge") in the battery 100 and detection of the amount of full charge in the battery 100 when the charge plug is inserted into an outlet of a charging stand and the battery 100 is charged.

The calendar-clock 52 generates data about a year, month, date, and time.

The map data storage unit 32 has facility information (which may also be referred to as point of interest information) recorded thereon, in addition to road map data including the location of the house of a user, such as a driver, which has been registered in advance by the user. In the present embodiment, the facility information includes information indicating the genres, names, and position information (latitude and longitude information) of public facilities, such as parking areas and service areas on expressways, parking spaces of city and town offices, parking spaces of public gymnasiums, parking spaces of parks, parking spaces of auto supply stores, service stations, parking spaces of shopping centers, parking spaces of shopping malls, parking spaces of drug stores, and automatic parking spaces.

In addition, a genre of "charging stand" may be part of the facility information. Charging stands may be categorized into (or, have the types of) private charging stands (also referred to as personal charging stands) located at, for example, house of a user or houses of friends of the users, which have no public nature (or, in other words, no public availability), and public charging stands, such as the parking areas and the service areas on expressways, which have public availability. Charging stands may also have information indicating a type of charging stand, such as a rapid charging type charging stand, a 200-volt charging stand (200 V), and a 100-volt charging stand (100 V). Alternative charging types may exist and such types may vary depending on an electricity system used by a region or types of charging equipment used by a local market. For example, in the United States, the charging types may include rapid charging stands that charge at 480 volts, 240 volt charging stands, and 120 volt charging stands.

The map data storage unit 32 stores, as the facility information, a private charging stand table (also referred to as a personal charging stand table) 56, which is a list of private charging stands, and a public charging stand table 58, which is a list of public charging stands. The private charging stand table 56 and the public charging stand table 58 are updated with new information in a manner described below. The positions of houses of users might not be included in the private charging stand table 56. This may be due to the owners or the likes of the electric vehicles 16 recognizing that they have the charging stands at their houses, such that it would be unnecessary to include their house as part of the private charging table 56. In some implementations, the position of houses of a user may be included in the private charging stand table 56.

The map data storage unit 20 in the server apparatus 12 stores a public charging stand table 60, which is updated with new information.

Operations of the in-vehicle navigation apparatus 18 according to the present embodiment, which may have the above configuration, will now be described in detail with reference to flowcharts involved in the navigation apparatus 18 in FIGS. 3 to 6.

Figure 3:
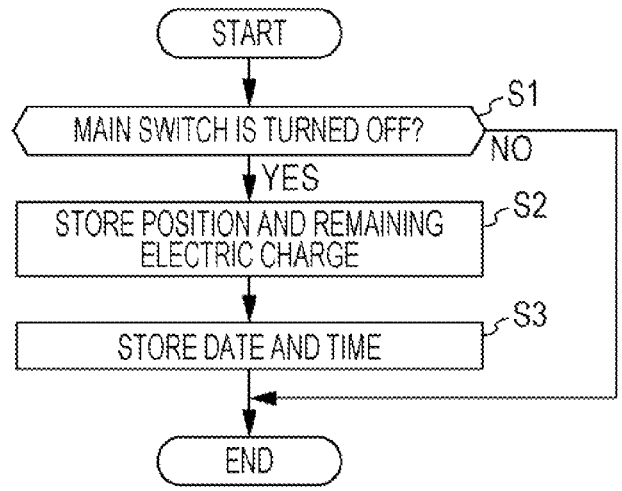
FIG. 3 is a first flowchart illustrating an operational process performed by the in-vehicle navigation apparatus illustrated in FIG. 2.

Referring to FIG. 3, in Step 51, the charging point determiner 38 monitors turning-off of the main switch 46. If the charging point determiner 38 detects that the main switch 46 is turned off (YES in Step S1), in Step S2, the charging point determiner 38 stores the current position (which may be indicated by latitude and longitude) detected by the GPS unit 34 in association with the current remaining electric charge detected by the battery monitor 50 in a memory (also referred to as a storage unit). The current position stored in the memory is called a stored current position and the current remaining electric charge stored in the memory is called a stored remaining electric charge. In Step S3, the charging point determiner 38 refers to the calendar-clock 52 to store the year, month, date, and time at the storage in association with the stored remaining electric charge and the stored current position.

Figure 4:
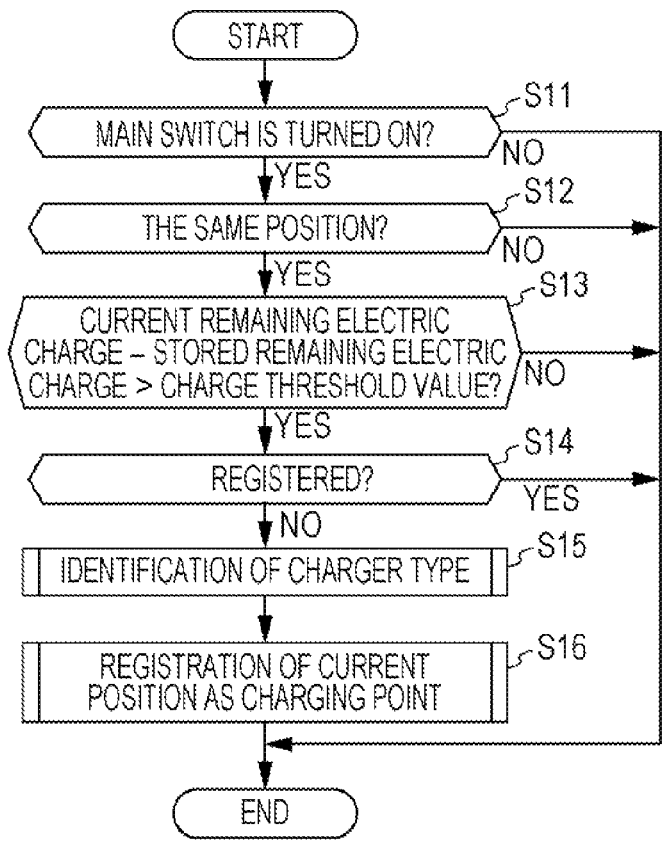
FIG. 4 is a second flowchart illustrating the operational process performed by the in-vehicle navigation apparatus illustrated in FIG. 2.

Referring to FIG. 4, in Step S11, the charging point determiner 38 monitors turning-on of the main switch 46. If the charging point determiner 38 detects that the main switch 46 is turned on (YES in Step S11), in Step S12, the charging point determiner 38 detects the current position (latitude and longitude) from the GPS unit 34 and determines whether the current position when the main switch 46 is turned on coincides with the stored current position when the main switch 46 is turned off in Step S1.

If the current position when the main switch 46 is turned on coincides with the stored current position when the main switch 46 is turned off in Step S1 (YES in Step S12), in Step S13, the charging point determiner 38 determines whether the difference resulting from subtraction of the stored remaining electric charge from the current remaining electric charge is larger than an amount-of-charge threshold value on the basis of the stored remaining electric charge and the current remaining electric charge detected by the battery monitor 50. The amount-of-charge threshold value is used to determine whether the battery 100 is charged while the main switch 46 is turned off If the above difference, that is, the current amount of charge is larger than the amount-of-charge threshold value (YES in Step S13), the charging point determiner 38 stores the current position detected in Step S12 in the memory as a charging point registration candidate position (a charging point candidate position). In other words, the charging point determiner 38 stores the current position in the memory as the charging point registration candidate position after the charging point determiner 38 confirms that the position of the electric vehicle 16 is not varied (YES in Step S12) and that the battery 100 is charged (YES in Step S13) when the main switch 46 is turned on (YES in Step S11).

In Step S14, the charging point determiner 38 determines whether the charging point registration candidate position is registered (stored) in the private charging stand table 56 or the public charging stand table 58 in the map data storage unit 32, that is, is registered as a charging point.

If the charging point registration candidate position is not registered as a charging point (NO in Step S14), in Step S15, the charging point determiner 38 performs a process of identifying the type of a charger involved in the charge.

Figure 5:
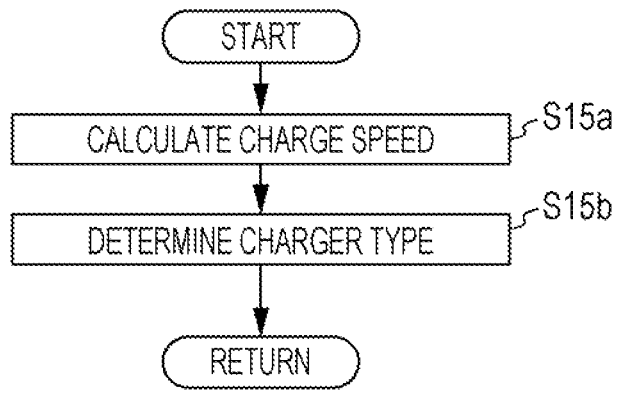
FIG. 5 is a third flowchart illustrating the operational process performed by the in-vehicle navigation apparatus illustrated in FIG. 2.

FIG. 5 is a flowchart illustrating in detail the process of identifying the type of the charger, performed by the charging point determiner 38 in Step S15.

In Step S15a, the charging point determiner 38 calculates a charge speed referred to as [Ah/h], which may be the amount of charge per unit time, according to Equation (1):

$$\text{Charge speed} = (\text{current remaining electric charge} - \text{stored remaining electric charge})/(\text{current time} - \text{time at storage}) \quad (1)$$

In Step S15b, the charging point determiner 38 determines that the charger type at the charging point registration candidate position is a rapid charger if the charge speed [Ah/h] is higher than a certain charge speed threshold value and determines that the charger type at the charging point registration candidate position is a 200-V normal charger or a 100-V normal charger on the basis of the voltage applied to the charge plug if the charge speed [Ah/h] is not higher than the certain charge speed threshold value. The charging point determiner 38 stores the result of the determination in the memory.

Referring back to FIG. 4, in Step S16, the charging point register 40 registers (stores) the charging point registration candidate position involved in the combination of the charger type stored in the memory and the current position of the charging stand in the private charging stand table 56 or the public charging stand table 58 on the basis of the result of a process of determining the necessity for uploading (which may also be referred to as a process of determining the necessity for transmission to the server apparatus 12) performed in the transmission necessity determiner 42 described in a detailed flowchart in Step S16.

Figure 6:
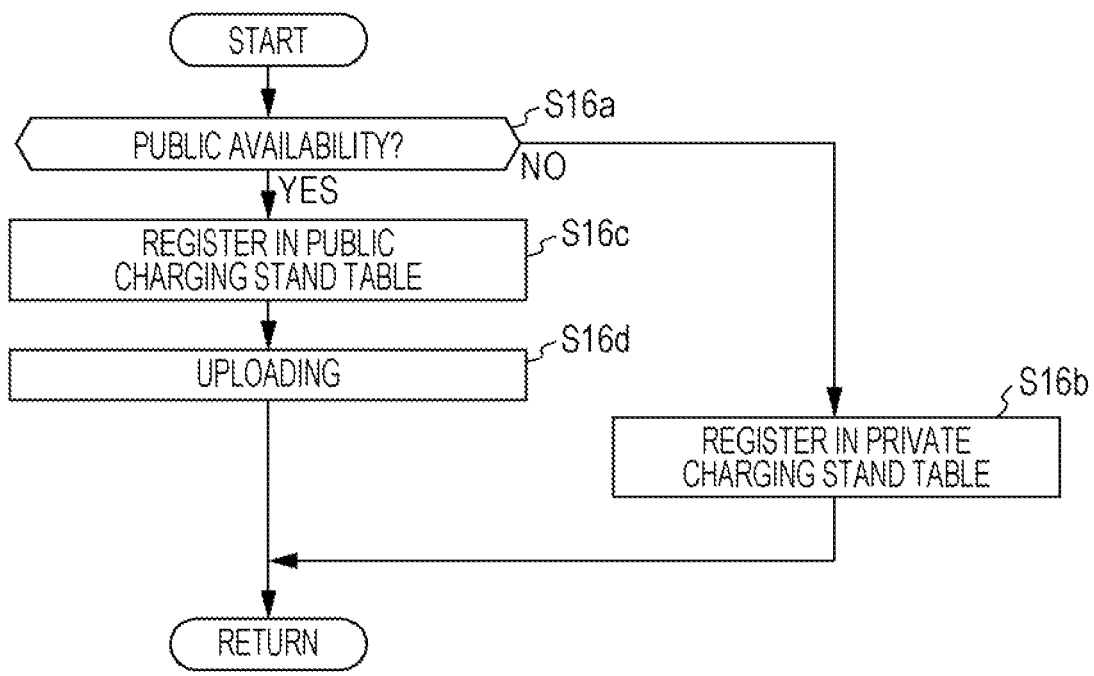
FIG. 6 is a fourth flowchart illustrating the operational process performed by the in-vehicle navigation apparatus illustrated in FIG. 2.

FIG. 6 is a flowchart illustrating in detail the process of registering the charging point in Step S16.

In the process of determining the necessity for uploading, specifically, in Step S16a, the transmission necessity determiner 42 determines whether the charging point registration candidate position involved in the combination of the charger type stored in the memory and the current position of the charging stand has public availability.

The presence of public availability is determined by referring to the map data storage unit 32 on the basis of the current position in the combination of the charger type stored in the memory and the current position of the charging stand (the charging point registration candidate position) to determine whether facility information (for example, the information about the parking areas and the service areas on expressways) exists near the current position (including the current position). If facility information does not exist near the current position (NO in Step S16a), in Step S16b, the charging point register 40 determines that the charging point registration candidate position indicates the position of a charging stand that is only personally or privately available, such as the house of a friend or an acquaintance of the user, and registers (stores) the charging point registration candidate position in the private charging stand table 56. In variations, the determination may be made as to whether facility information indicates a public facility exists near the current position rather than any facility information. For example, some facility information may indicate a private location while other facility information may indicate a public location. Following that example, a private road or series of private roads near a current position may indicate that a current location is representative of a private charging stand location. As another example, a restricted area, such as a military base may indicate a location is not available to the general public and therefore not public in the sense that it should be part of the public charging stand table.

If facility information exists near the current position, the transmission necessity determiner 42 determines in Step S16a that the charging point registration candidate position has public availability (YES in Step S16a) and, in Step S16c, the charging point register 40 registers the charging point registration candidate position in the public charging stand table 58 as a charging point having public availability.

In Step S16d, the communicator 44 uploads the registered charging point having public availability.

Specifically, in the uploading in Step S16d, the transmission necessity determiner 42 transmits the charging point that is registered in the public charging stand table 58 and that has public availability to the server apparatus 12 via the communicator 44.

The charging point register 26 in the server apparatus 12, which receives the charging point having public availability via the communicator 30 in the server apparatus 12, registers (stores) the charging point having public availability in the public charging stand table 60 in the map data storage unit 20.

Since the uploading in Step S16d is a process of transmitting data from the communicator 44 in the navigation apparatus 18 to the communicator 30 in the server apparatus 12 via a mobile communication network (not shown), a communication cost generally occurs. Accordingly, in some implementations, it might be desirable in terms cost that a registration of a current position (the charging point registration candidate position) in the server apparatus 12 as a charging point in Step S16 (refer to FIG. 4) be performed in conjunction with acquisition of traffic information or the like from the server apparatus 12.

The charging point distributor 28 in the server apparatus 12 distributes the charging point (position data about the charging stand with the charger type and a mark indicating the charging stand) in the public charging stand table 60 to the electric vehicle 16 via the communicator 30 when a new charging point having the public availability is registered in the public charging stand table 60 or when a request to distribute the charging points having public availability is submitted from the navigation apparatus 18 in the electric vehicle 16.

As described above, when the charging point determiner 38 determines that the current position is a charging point on the basis of the charge information about the electric vehicle 16, the in-vehicle navigation apparatus 18 according to the present embodiment determines whether the charging point has public availability by referring to the facility information (facility position) in the map data stored in the map data storage unit 32. As the result of the determination, since the in-vehicle navigation apparatus 18 transmits the charging point having public availability to the server apparatus 12 and does not transmit the charging point having no public availability to the server apparatus 12, it may be possible to avoid use of the private charging points including personal houses by other vehicles.

In addition, since the transmission necessity determiner 42 in the navigation apparatus 18 refers to the facility information in the map data stored in the map data storage unit 32 to determine that the charging point has public availability if a facility exists near the charging point, it may be possible for the electric vehicle 16 to use the charging points where other vehicles are charged and which have public availability while avoiding use of the private charging points such as personal houses of other vehicles.

As described above, the facility information includes information about, for example, parking areas and service areas on expressways, parking spaces of city and town offices, parking spaces of public gymnasiums, parking spaces of parks, parking spaces of auto supply stores, service stations, parking spaces of shopping centers, parking spaces of shopping malls, parking spaces of drug stores, and automatic parking spaces.

A server apparatus according to another embodiment of the present disclosure will now be described. The same reference numerals are used in the drawings described below to identify the same components illustrated in the navigation system 10 described above for convenience, and a detailed description of such components is omitted herein. An alphabet "A" is added to reference numerals denoting components similar to the ones in the navigation system 10 described above, and such components having the alphabet "A" are described in a non-redundant manner.

Figure 7:
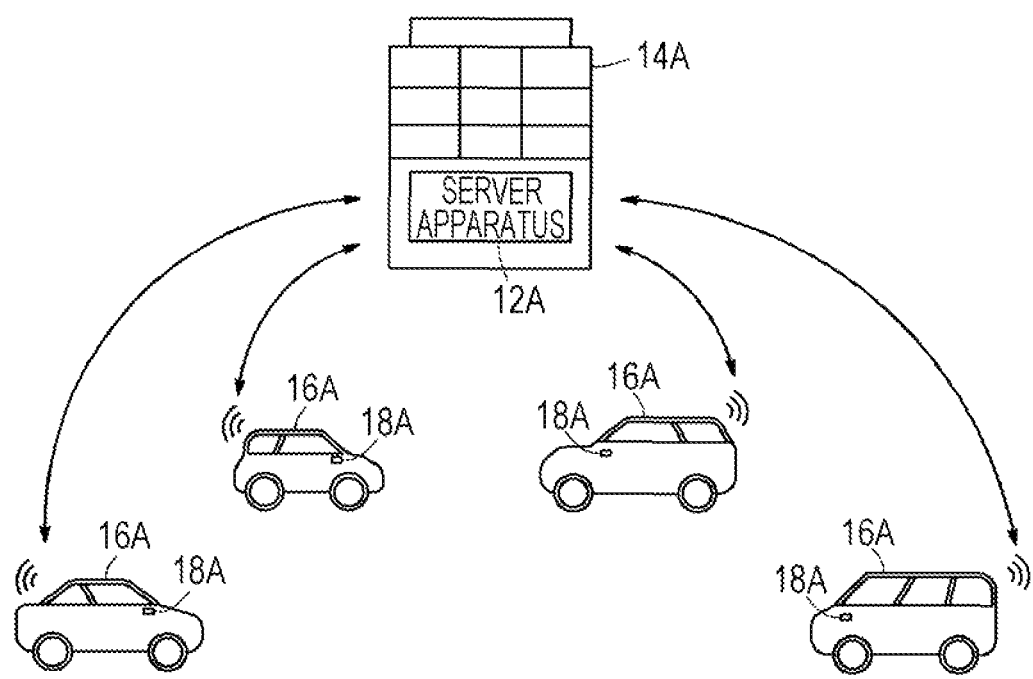
FIG. 7 schematically illustrates a navigation system including a server apparatus according to another embodiment.

FIG. 7 schematically illustrates a navigation system 10A including a navigation apparatus 18A and a server apparatus 12A.

Figure 8:
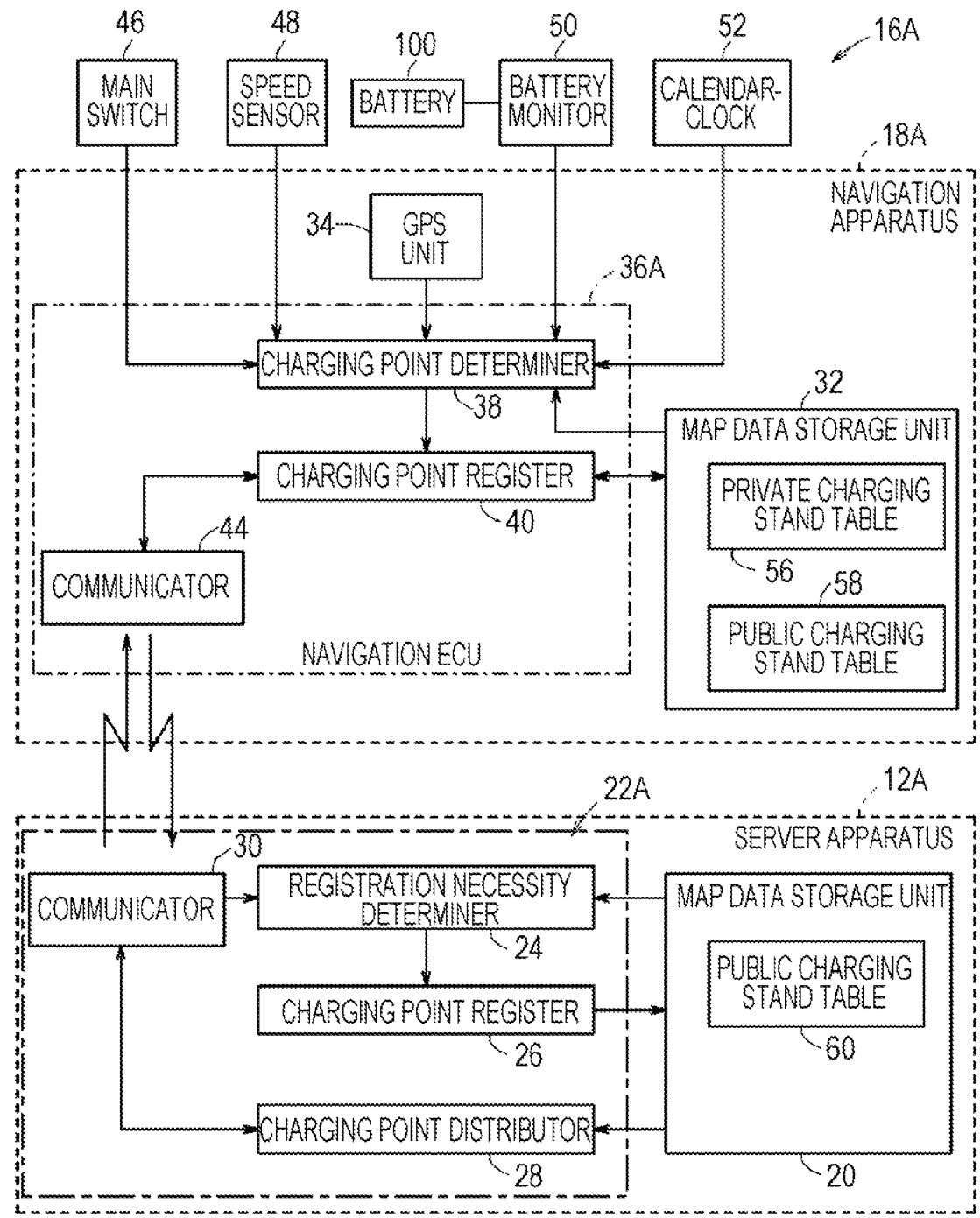
FIG. 8 is a block diagram illustrating an example of a detailed configuration of the navigation system illustrated in FIG. 7.

FIG. 8 is a block diagram illustrating an example of a detailed configuration of the navigation system 10A including the server apparatus 12A. The navigation apparatus 18A in the example in FIG. 8 differs from the navigation apparatus 18 in FIG. 2 in that the navigation apparatus 18A includes a navigation ECU 36A that does not include the transmission necessity determiner 42. The server apparatus 12A in FIG. 8 differs from the server apparatus 12 in FIG. 2 in that the server apparatus 12A includes a control unit 22A having a registration necessity determiner 24 added thereto.

Figure 9:
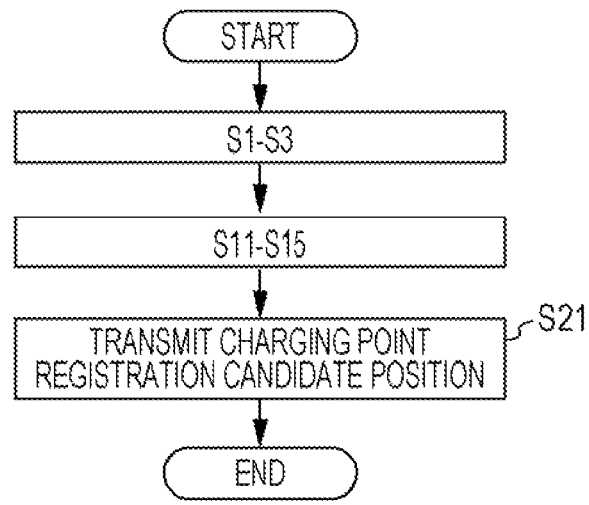
FIG. 9 is a flowchart illustrating an operational process performed by an in-vehicle navigation apparatus illustrated in FIG. 8.

As illustrated in a simplified flowchart in FIG. 9, operations in Steps S1 to S3 and Steps S11 to S15 in the navigation apparatus 18A are the same as the operations in the navigation apparatus 18.

Briefly, if the main switch 46 is turned off (YES in Step S1), in Steps S2 and S3, the navigation ECU 36A stores the current position and the current remaining electric charge in the memory in association with the year, month, date, and time.

If the main switch 46 is turned on (YES in Step S11) and the current position when the main switch 46 is turned on coincides with the current position when the main switch 46 is turned off (YES in Step S12), the navigation ECU 36A determines whether the battery 100 is charged on the basis of the remaining electric charge when the main switch 46 is turned off and the current remaining electric charge. If the current amount of charge is larger than the amount-of-charge threshold value (YES in Step S13), the navigation ECU 36A stores the current position when the main switch 46 is turned on in the memory as a charging point registration candidate position.

If the charging point registration candidate position is not registered (stored) in the private charging stand table 56 or the public charging stand table 58 in the map data storage unit 32, that is, the charging point registration candidate position is not registered as a charging point (NO in Step S14), the navigation ECU 36A performs the identification of the charger type involved in the current charge (Step S15), determines the charger type: for example, rapid charger, 200-V normal charger, or 100-V normal charger, and stores the determined charger type in the memory.

In Step S21, the charging point register 40 in the navigation ECU 36A transmits the charging point registration candidate position with the charging stand type stored in the memory to the server apparatus 12A via the communicator 44.

Figure 10:
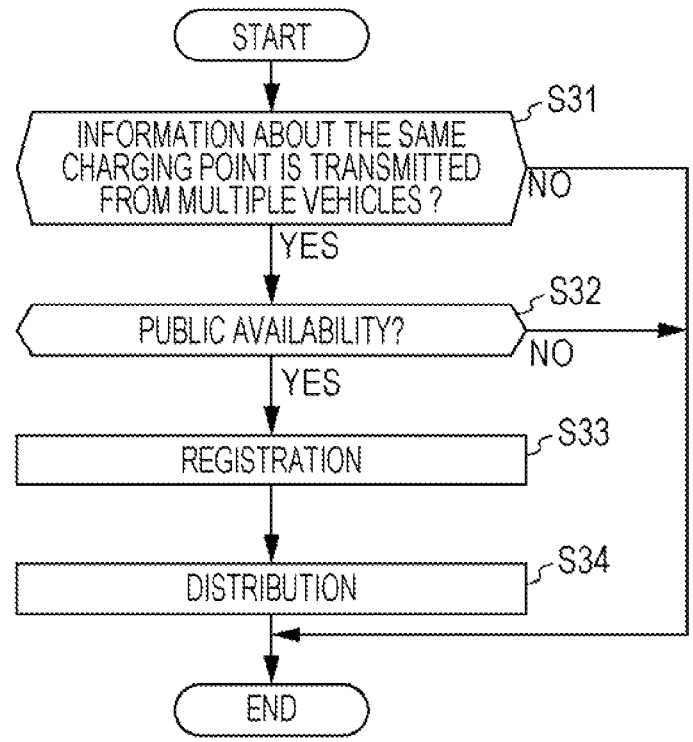
FIG. 10 is a flowchart illustrating an operational process performed by the server apparatus illustrated in FIG. 8.

FIG. 10 is a flowchart illustrating an example of an operation in the server apparatus 12A according to the present embodiment.

Referring to FIG. 10, in Step S31, the registration necessity determiner 24 in the server apparatus 12A determines whether information about the same charging point with the charging stand type is transmitted (uploaded) from the multiple navigation apparatuses 18A (the electric vehicles 16A). If the determination in Step S31 is affirmative (YES in Step S31), in Step S32, the registration necessity determiner 24 determines whether the charging point with the charging stand type has public availability.

Also in this case, the presence of public availability is determined by referring to the map data storage unit 32 for the charging point with the charging stand type to determine whether facility information (for example, the information about the parking areas and the service areas on expressways) exists near the current position (including the current position). If facility information exists near the current position, the registration necessity determiner 24 determines that the charging point with the charging stand type has public availability (YES in Step S32). In Step S33, the charging point register 26 registers the charging point with the charging stand type in the public charging stand table 60 as a charging point having public availability (updates the public charging stand table 60).

In Step S34, the charging point distributor 28 distributes the charging point (positional data about the charging stand with the charger type and a mark indicating the charging stand) in the public charging stand table 60 to the electric vehicle 16A via the communicator 30 when a new charging point having public availability is registered in the public charging stand table 60 or when a request to distribute the charging points having public availability is submitted from the navigation apparatus 18A in the electric vehicle 16A.

The charging point register 40 registers the charging point having public availability, which is distributed from the server apparatus 12A via the communicator 44 in the navigation apparatus 18A in the electric vehicle 16A, in the public charging stand table 58 of its own vehicle along with a mark (a public charging stand mark) indicating that the charging point has public availability for subsequent use.

As described above, in the server apparatus 12A according to the present embodiment, the registration necessity determiner 24 refers to the facility information in the map data stored in the map data storage unit 20 for the charging point received from the electric vehicle 16A, determines that the charging point has public availability if a facility exists near the charging point, registers the charging point having public availability in the public charging stand table 60, and distributes the charging point to the navigation apparatus 18A in the electric vehicle 16A. Accordingly, it is possible for the electric vehicle 16A to use the charging points where the electric vehicle 16A is charged and which has public availability while avoiding use of the private charging points including personal houses by the electric vehicle 16A.

The features described can be implemented in digital electronic circuitry, or in computer hardware, firmware, software, or in combinations of them. The apparatus can be implemented in a computer program product tangibly embodied in an information carrier, e.g., in a machine-readable storage device or otherwise in a computer-readable media, for execution by a programmable processor; and methods can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may be a processor for executing instructions and one or more memories for storing instructions and data. A computer may also include, or be operatively coupled to communicate with, one or more mass storage devices for storing data files; such devices include magnetic disks, such as internal hard disks and removable disks (e.g., magneto-optical disks, optical disks, solid-state disks, and the like). Storage devices suitable for tangibly embodying computer program instructions and data include all forms of non-volatile memory, including by way of example semiconductor memory devices, such as EPROM (erasable programmable read only memory), EEPROM (electrically erasable programmable read only memory), and flash memory devices; magnetic disks such as internal hard disks and removable disks; magneto-optical disks; and CD-ROM (compact disc read only memory) and DVD-ROM (digital versatile disc read only memory) disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), or other type of monitor for displaying information to the user and a keyboard and a pointing device such as a mouse or a trackball by which the user can provide input to the computer. Other input devices may include a joystick-type device, a touch-screen display, hard buttons (e.g., physical buttons tied to one or more operations), and/or soft buttons (e.g., physical buttons that depend on a context in which a program is running).

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet. Communication networks may use various technologies for wired and wireless communications, such as CDMA (Code Division Multiple Access), LTE (Long Term Evolution), IEEE (Institute of Electrical and Electronics Engineers) 802.11 standards, and the like.

The computer system can include clients and servers. A client and server are generally remote from each other and typically interact through a network, such as the described one. A server may also be referred as being "external" to a client. For example, by the server being part of a separate apparatus from a client. The relationship of client and server arises by virtue of computer programs running on the respective computers and having a client-server relationship to each other. In the case of the navigation systems described above, the navigation apparatus of a vehicle may be a client to the server.

In the navigation apparatus 18 and the server apparatus 12A according to the above embodiments, although the determination of the charging point is performed by the charging point determiner 38 in the navigation ECU 36 and the navigation ECU 36A, the present disclosure is not limited to the above embodiments and various configurations may be realized on the basis of the content of description in this specification. For example, the current position and the remaining electric charge may be transmitted from the navigation apparatus to the server apparatus when the main switch 46 is turned off and the current position and the remaining electric charge may also be transmitted from the navigation apparatus to the server apparatus when the main switch 46 is turned on, and the server apparatus may determine whether the current position is a charging point, may determine the charger type if the current position is a charging point, and may determine whether the charging point has public availability. As another example, while the disclosure has been described with references to variations of electric charging systems for vehicles, the techniques disclosed may be relevant to other distributed and/or growing fueling systems, such hydrogen fueling, natural gas fueling, and the like. For example, new publicly available natural gas fueling stations may be uploaded to a server from a vehicle's navigation system of a natural gas vehicle and downloaded to other natural gas vehicles. As another example, while the disclosure has been described with reference to plug-in electric charging technologies, the techniques of the disclosure may be applied to other charging technologies such as inductive charging. As another example, while the process of FIG. 5 in combination with equation 1 is shown to indicate one way to determine a type of charger, there may be other ways to determine a type of charger. For example, one type of charger may identify itself through an electronic signal. As another example, based on a type of connection made with a charging device (e.g., a type of plug used), a type of charger may be determined. As another example, a type of charger may be determined by waking up the system during charging and determining a charging rate. While specific implementations of systems have been described with specific flow charts or processes, variations may use different systems and/or processes. For example, a navigation system varying from the navigation system 10 described above may be used with processes similar to the processes described with reference to FIGS. 3-6.

What is claimed is:

1. An in-vehicle navigation apparatus comprising:
a map data storage unit configured to store map data, the map data comprising facility information;
a current position detecting unit configured to detect a current position of a vehicle associated with the in-vehicle navigation apparatus;
a charging point determining unit configured to determine whether the current position detected by the current position detecting unit is a charging point on the basis of charge information on the vehicle;
a charging point registering unit configured to:
register the charging point determined by the current position detecting unit, the charging point determined by the current position detecting unit as previously not registered as the charging point with the in-vehicle navigation apparatus and
register a server-sourced charging point received from a server apparatus external from the in-vehicle navigation apparatus in the map data storage unit;
a transmission necessity determining unit configured to determine necessity for transmission of the charging point determined by the charging point determining unit to the server apparatus; and
a communicating unit configured to transmit the charging point determined to have the necessity for transmission by the transmission necessity determining unit to the server apparatus and receive the server-sourced charging point from the server apparatus,
wherein the transmission necessity determining unit determines the presence of public availability of the charging point by referring to the facility information in the map data to determine that the charging point has the public availability instead of private availability if a facility exists near the charging point, and the transmission necessity determining unit determines that the charging point having the public availability has the necessity for transmission.

2. The in-vehicle navigation apparatus according to claim 1,
wherein the transmission necessity determining unit refers to the facility information in the map data to determine that the charging point does not have the public availability if the facility does not exist near the charging point.

3. The in-vehicle navigation apparatus according to claim 1, wherein the charging point is a point for electrically charging an electric vehicle.

4. The in-vehicle navigation apparatus according to claim 1,
wherein the charging point registering unit refers to the facility information in the map data to determine that the current position is a public charging point if the facility does exists near the charging point and otherwise determines the current position is a private charging point, and the charging point registering unit registers public charging points in a registry of public charging points and separately registers private charging points in a registry of private charging points.

5. The in-vehicle navigation apparatus according to claim 1,
wherein the vehicle is an electric vehicle; and
wherein the charging point determining unit is configured to compare the current state of charge of the vehicle with a previous state of charge of the vehicle to determine that a current position is the charging point if the current state of charge is greater than the previous state of charge by at least a certain threshold.

6. The in-vehicle navigation apparatus according to claim 5,
wherein the charging point determining unit is further configured to determine a charging rate of the charging point by comparing the current state of charge with the previous state of charge and taking into account time passed between the current state of charge and the previous state of charge.

7. A computer program product embodied on computer-readable media, the media comprising computer-readable instructions, the instructions operable to cause one or more processors to perform operations comprising:

detecting a current position of a vehicle;
determining whether the current position is a fueling point on the basis of fueling information of the vehicle;
determining if the fueling point was not previously registered in a fueling point register associated with map data of the vehicle;
registering the current position as the fueling point in the fueling point register associated with the map data if the current position is determined to be the fueling point and the fueling point is determined to not have been previously registered;
determining if the fueling point is to be categorized as being public or private, wherein the fueling point is categorized as being public instead of being private if the current position is associated with a public location in map data and the current position is determined to be the fueling point; and
transmitting the current position to a server computer if the current position is determined to be categorized as being public.

8. The computer program product of claim 7, wherein the fueling point is an electric charging point for electric vehicles.

9. The computer program product of claim 7, wherein the operation of determining whether the current position is the fueling point comprises:
determining whether the vehicle has had an increase in fuel;
determining that if the vehicle has had an increase in fuel the current position is the fueling point.

10. The computer program product of claim 7, wherein:
registering the current position as the fueling point in the fueling point register associated with the map data comprises:
registering the current position in a table of public fueling points if the current position is a public fueling point; and
registering the current position in a table of private fueling points if the current position is a private fueling point.

11. The computer program product of claim 7 wherein the operations further comprise:
registering fueling points received from the server computer.

12. The computer program product of claim 7, wherein:
the vehicle is an electric vehicle; and
the operations further comprise:
comparing the current state of charge of the vehicle with a previous state of charge of the vehicle to determine that the current position is the fueling point if the current state of charge is greater than the previous state of charge by at least a certain threshold.

* * * * *